United States Patent [19]

Snyder

[11] Patent Number: 5,027,847
[45] Date of Patent: Jul. 2, 1991

[54] PNEUMATIC VALVE ACTUATOR SEQUENCING CONTROL SYSTEM AND SEQUENCING RELAY DEVICE INCORPORATED THEREIN

[75] Inventor: David E. Snyder, Longview, Tex.

[73] Assignee: Axelson Incorporated, Longview, Tex.

[21] Appl. No.: 433,544

[22] Filed: Nov. 8, 1989

[51] Int. Cl.⁵ .......................................... G05D 16/10
[52] U.S. Cl. .................................... 137/119; 137/596
[58] Field of Search ......................... 137/118, 119, 596

[56] References Cited

U.S. PATENT DOCUMENTS

| | | | |
|---|---|---|---|
| 2,644,481 | 7/1953 | Perlman . | |
| 2,700,983 | 2/1955 | Bryant | 137/505.11 |
| 2,965,121 | 12/1960 | Howlett | 137/116.5 |
| 3,236,261 | 2/1966 | Morgan | 137/628 |
| 3,415,282 | 12/1968 | Zoludow | 137/625.48 |
| 3,570,542 | 3/1971 | Otto et al. | 137/628 |
| 3,623,509 | 11/1971 | Sesseler et al. | 137/630.15 |
| 3,896,852 | 7/1975 | Holmes | 137/596.18 |
| 3,993,100 | 11/1976 | Pollard et al. | 137/628 |
| 4,192,337 | 3/1980 | Alderson | 137/118 X |
| 4,244,390 | 1/1981 | Kervagoret | 137/118 |
| 4,522,221 | 6/1985 | Chivens | 137/118 |

*Primary Examiner*—Alan Cohan
*Attorney, Agent, or Firm*—Jones, Day, Reavis & Pogue

[57] ABSTRACT

A multi-valve, multi-port, relay device used in a control system for sequentially pressurizing a first reservoir before a second and depressurizing the second reservoir before the first. A piston valve configuration for blocking a second outlet permitting an external pressure supply source to pressurize an external reservoir via a first outlet. The piston is biased in the second outlet blocking position by a spring having a force preselected by the operator via an adjustment screw. A pressure force greater than the piston spring biasing force opens the piston valve configuration. When open, the piston valve configuration and a check valve configuration cooperates to block flow out of the first outlet, but permit flow out the second outlet to a second external reservoir, until full pressurization. An overpressurization feature enables the bleed off of pressure increases associated with thermal expansion of the working fluid. Termination of the supply pressure gives rise to an associated backflow pressure from both external reservoirs, but the piston valve configuration stays open temporarily due to the backpressure from the first outlet, thereby permitting depressurization of the second external reservoir, following which the piston closes permitting a first external reservoir to depressurize and in a low pressure operable embodiment thereof, the second external reservoir begins a residual pressure bleed off stage via a poppet valve.

20 Claims, 3 Drawing Sheets

PNEUMATIC VALVE ACTUATOR SEQUENCING CONTROL SYSTEM AND SEQUENCING RELAY DEVICE INCORPORATED THEREIN

BACKGROUND OF THE INVENTION

The present invention relates generally to pneumatic or hydraulic actuated relay switching systems and devices and, in a preferred embodiment thereof, more particularly provides a wholly mechanical, fluid pressure actuated sequencing relay device for regulating and controlling the order in which main and wing valve actuators are pressurized and depressurized.

The "Christmas tree" valve configuration in production fluid piping for oil and gas wells is quite common and comprises a regulated main flow supply valve and a diverting pipeline network having paths downstream from the main valve that are opened and closed by secondary valves, known as wing valves.

Some Federal regulations now require a fail-safe valve system at the wellhead in certain oil and gas fields which is operative to assure that if the main valve is opened or closed the wing valves are automatically opened or closed, and vice versa. Therefore, it is advantageous to develop a system to perform a series of operations in a prescribed order so that a fail-safe valve system is utilized and the federal regulations are complied with.

It is well known in the oil and gas recovery and extraction industry that the main valve is to be opened prior to opening the wing valves to initiate production fluid flow. Similarly, when terminating the delivery of the product, it is desirable to close the wing valves first, and then close the main valve, so that the main valve is closed at a "no flow" condition to prolong its operating life.

In the past, the opening and closing sequence of the main and wing valves was effected manually. In recent years, however, the sequential operation of the main and wing valves has been automatically accomplished by a relatively complex system of mechanical sequencing circuits that incorporate a conventional block and bleed relay, a time delay mechanism, and a pilot supply for each valve actuator. It is also well known among those skilled in the art to incorporate time delay circuits between the main valve and wing valves. The circuitry initiates or delays the "open" and "closed" signal to a particular valve so as to promote the proper sequencing.

The major drawback with the conventional systems is an increased propensity for mechanical failure of any one of the numerous components, thereby rendering the entire system inoperable or ineffective.

Therefore, it is desirable to develop a device to sequentially pressurize a first reservoir, before pressurizing a second reservoir, then depressurize the second before depressurizing the first, thereby eliminating the need for the multiplicity of elements in the conventional relay switching system. It is accordingly an object of the present invention to provide such a device for use in a relay switching system.

SUMMARY OF THE INVENTION

In carrying out the principles of the present invention, in accordance with the preferred embodiments, (i) for a low pressure embodiment operable with pressures of 150 psi or less, and (ii) for a high pressure embodiment operable with pressures in the range from 1000–5000 psi; a multi-port, multi-valve, pressure sequencing control device is provided with a means for sequentially pressurizing a first external reservoir (such as the actuating chamber of a main valve), pressurizing a second external reservoir (such as the actuating chamber of the wing valve), depressurizing the second external reservoir, and depressurizing the first external reservoir. In addition to the foregoing, the low pressure embodiment will bleed off the residual pressure that becomes trapped in the second external reservoir.

The device comprises a housing having three chambers, namely, a first and second plenum, and a central passageway communicating therebetween. An inlet provides communication between the central passageway and an external pressurized fluid source. A pair of outlets communicate the first and second plenum with the external reservoirs that are to be pressurized (or depressurized).

The low pressure embodiment is configured such that a piston member disposed within the first plenum is spring-biased against a mechanical stop shoulder. Similarly, a check valve element having a central bore, and relief ports, is spring-biased against a valve seat within the second plenum. A piston stem is rigidly connected to the base of the piston extending through the central passageway of the housing, and is slidably received within the central bore of the check valve. The high pressure embodiment is substantially the same except that the check valve portion is comprised of two cooperating elements.

When pressurized fluid enters the housing interior through the inlet of either embodiment, it is prevented from entering the first plenum via the central passageway, because of the sealing contact of the biased piston against a stop disposed within the first plenum. The flow travels through the central passageway through the check valve portion, into the second plenum and eventually out the second plenum outlet, thereby pressurizing the first external reservoir.

Back pressure build-up associated with the pressurized first external reservoir that communicates with the second plenum, will overcome the preselected spring bias force on the piston—forcing the piston assembly upward to an open position, whereby the piston stem also rises in an upward direction causing the check valve portion to close. Continued pressurized fluid inflow to the housing is rerouted into the first plenum, and through the first plenum outlet to subsequently pressurize the second external chamber.

Additionally, the low pressure embodiment described herein functions such that once the fluid pressure builds up in the first external reservoir, a pressure rise within the housing will overcome the spring biasing force on the check valve, forcing the check valve to open slightly and allow fluid supply flow to access both plenums and both outlets. As pressure becomes equalized within the housing, the spring biasing force on the check valve member causes it to close. Again, the piston stem blocks the check valve relief ports. This sealing contact does not form a full seal. Consequently, a passage for a slight bleed off of pressurized fluid from the second plenum is provided, thereby preventing overpressurization of the first external reservoir due to thermal expansion of the working fluid therein.

The sealing contact associated with the check valve of the high pressure embodiment is ideally a full seal, and thus a means for venting excess pressure due to the thermal expansion of the working fluid must be provided. Hence, a pressure relief outlet in direct communication with the lower plenum is incorporated therein.

When the supply pressure to the device is cut off, the external reservoirs attempt to depressurize. The natural back pressure consonant with the depressurization allows the check valve portion to remain closed and the piston assembly to stay open. The second external reservoir depressurizes first.

When the backpressure force through the first plenum outlet is less than the spring biasing force on the piston, the piston closes. Some residual pressure will remain trapped in the first plenum and upper outlet of the low pressure embodiment. Because of its lower operating pressures it is advantageous to bleed off this residual pressure from the body via a poppet valve.

When the piston of either embodiment returns to its closed position, the second plenum and first external reservoir depressurize by essentially the same paths as its pressurization cycle, except in reverse.

Hence, the inventive device as described and claimed herein, is operable in a relay system that accomplishes essentially the same tasks and achieves the same results as a conventional relay system utilizing a greater number of relay elements.

The device performs a multiplicity of switching operations in a single, wholly mechanical, fluid actuated apparatus, thus reducing hardware costs, increasing reliability, and decreasing maintenance costs.

Therefore, it can be easily seen that the present invention embodies a suitable, cost effective, efficient, and mechanically reliable system for sequentially pressurizing a first reservoir before a second reservoir, then depressurizing the second reservoir before the first. In addition, the pressure necessary to effectuate the pressurizing and depressurization sequence may be selectively varied by an operator or workman via an adjustment screw threadably connected to the top of the relay housing, and extending downwardly into the first plenum and bearing against the piston biasing spring.

DETAILED DESCRIPTION

Figure 1:
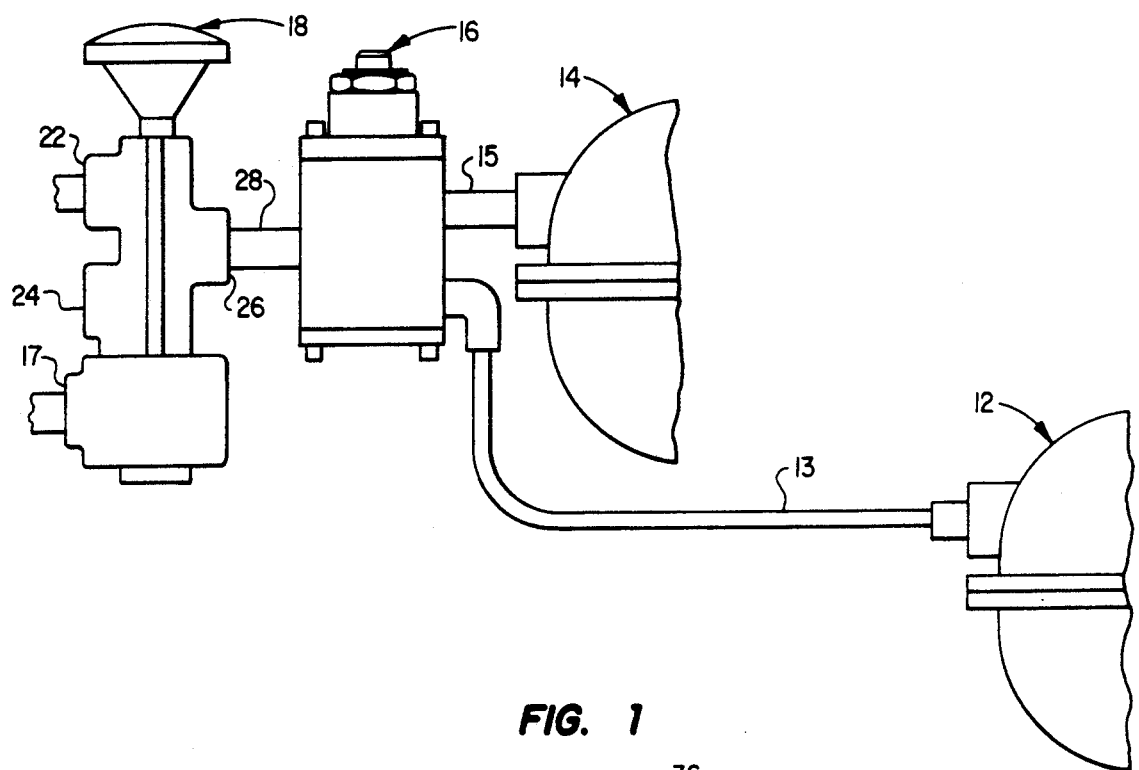
FIG. 1 is a schematic diagram of an improved pneumatic actuation system representatively utilized to control the opening and closing of production fluid piping master and wing valves, and incorporating a uniquely operative pneumatic sequencing relay device that embodies principles of the present invention.

Schematically illustrated in FIG. 1 is a pneumatic actuation system 10 which is utilized to sequentially pressurize, and then sequentially depressurize, the pneumatic actuator chamber portions 12 and 14 of production fluid piping master and wing valves (not shown) such as those typically installed in production piping in oil and gas recovery operations. Incorporated in system 10 is a uniquely operative pneumatic sequencing relay device 16 or 216 (the reference numeral for the high pressure embodiment), which embodies principles of the present invention and, as illustrated, is operatively interposed between the valve actuators 12, 14 and a conventional pneumatic block and bleed relay 18 which may be, for example, a Model 45788-100 or -200 series relay as manufactured by Axelson, Inc., P.O. Box 2427, Longview, Texas 75606.

The relay device 16, 216 communicates with the master valve actuator 12, by line 13, and the wing valve actuator 14, by line 15, and, in a manner subsequently described, regulates the transmission of a pressurized fluid flow to the valve actuators so that the wing valve actuator is always activated after, and deactivated before the master valve actuator.

The relay 18 has a supply inlet port 22, for receiving a main flow of pressurized fluid from a source thereof, a pilot supply inlet port 17 for receiving a relay triggering pressurized fluid from a source thereof, and an outlet port 26 that communicates with the relay device 16, 216.

Fluid flow into the switching portion of the relay 18, via port 17, causes the internal pressure of the relay to rise. Once this pressure rises above a preselected level, the exhaust outlet 24 closes, and the main supply inlet 22 opens. Fluid flow from the main supply passes through the relay and exits through outlet 26 into relay device 16, 216 via conduit 28.

When the pilot supply pressure drops below the preselected level, the switching portion of the relay 18 closes the main supply inlet 22, and opens exhaust outlet 24, allowing the high pressure fluid within the system to bleed from the relay device 16, 216, back through conduit 28 into relay 18, and be expelled through exhaust outlet 24.

Figure 2:
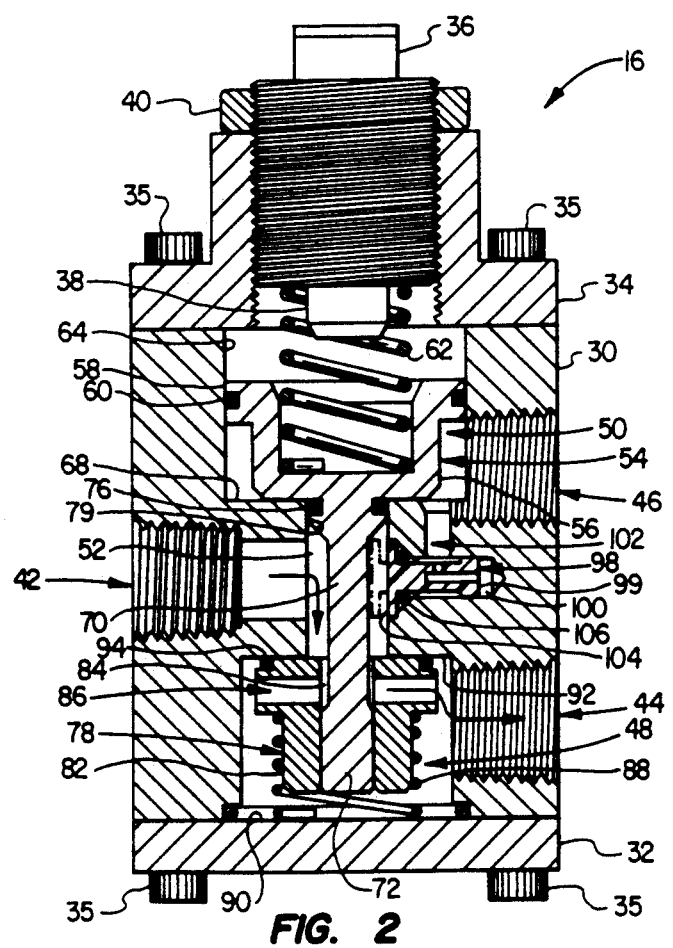
FIGS. 2–4 are enlarged scale cross-sectional views of the low pressure embodiment of the sequencing relay device and that sequentially illustrate its fluid-driven operation.
Figure 3:
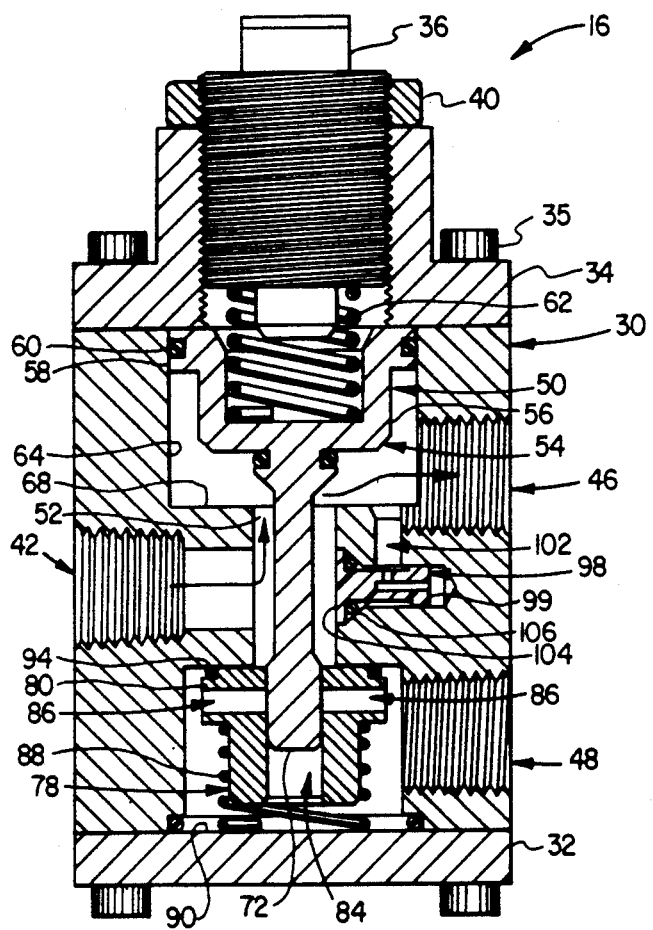
Figure 4:
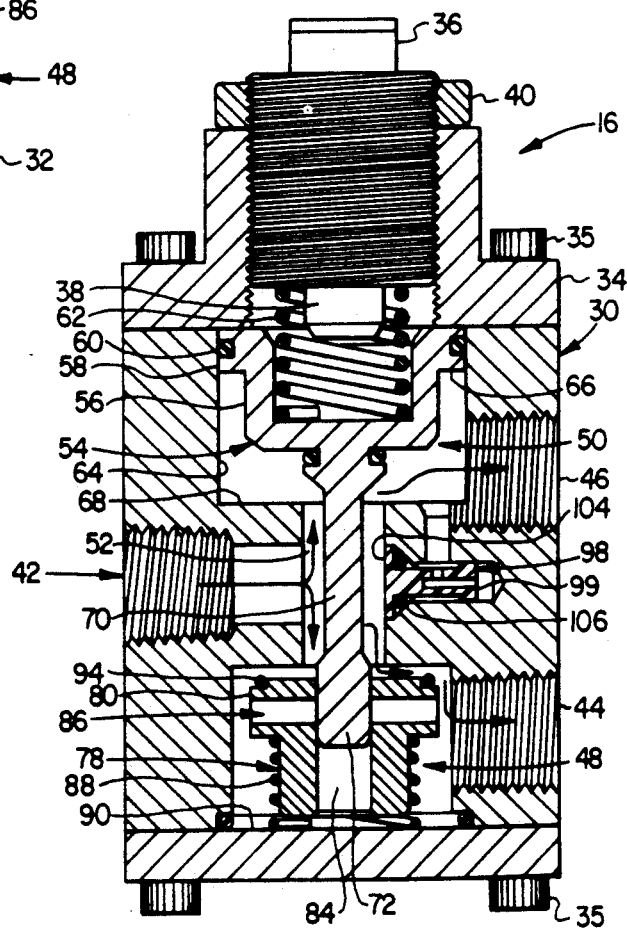
Figure 5:
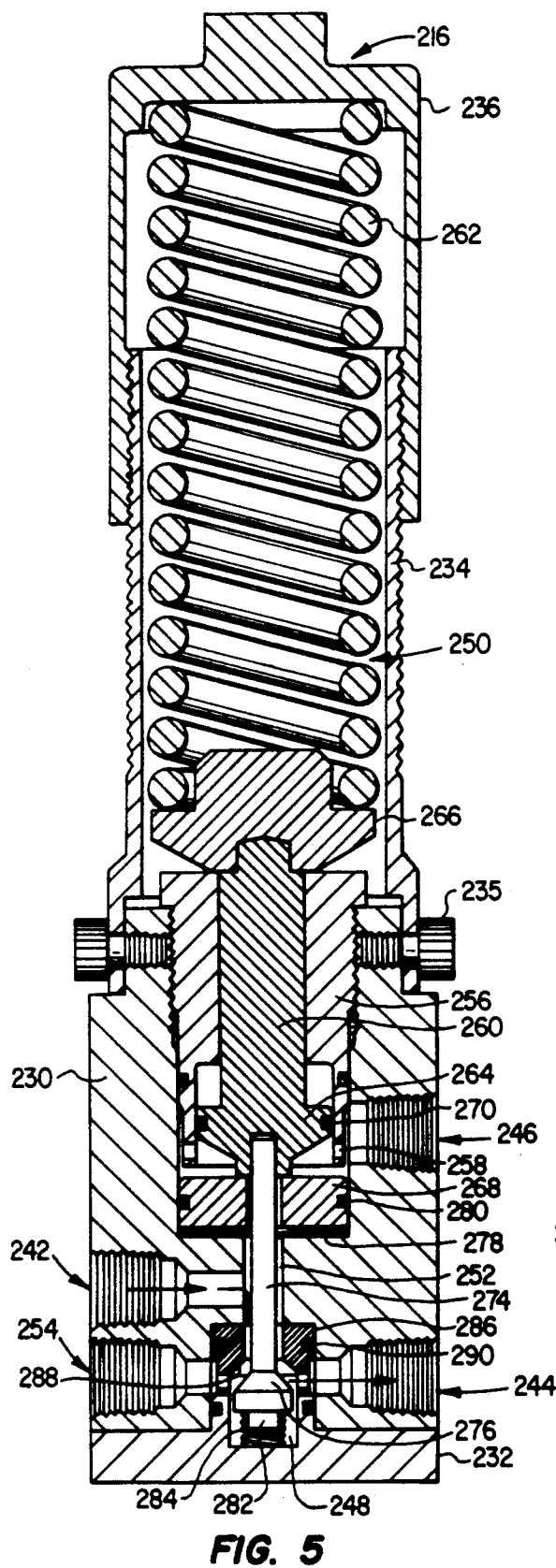
FIGS. 5 and 6 are enlarged scale cross-sectional views of the high pressure embodiment of the sequencing relay device and that sequentially illustrate its fluid-driven operation.
Figure 6:
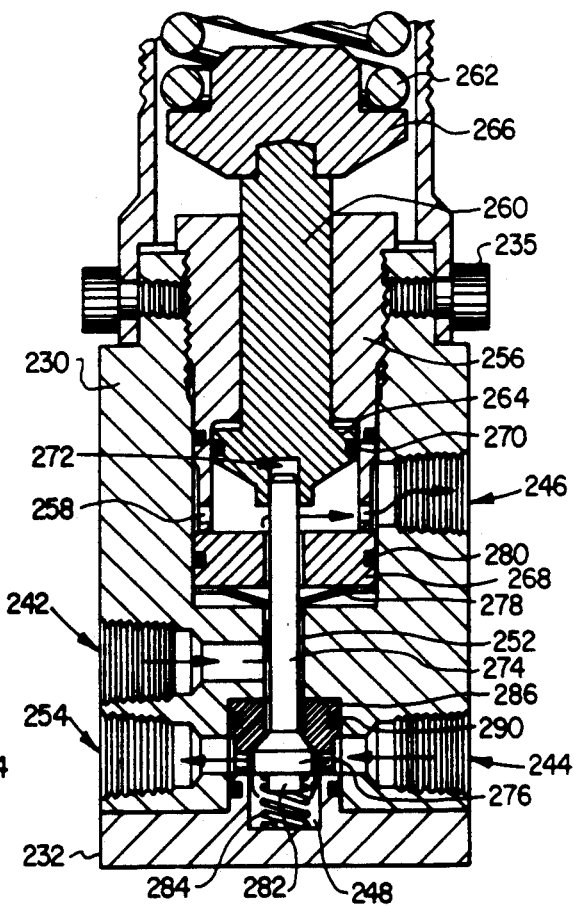

FIGS. 2–4 show the structural body components of the low pressure embodiment of the relay device 16 which is particularly useful in low pressure fluid flow applications having an operative pressure range up to 150 psi inclusive. FIGS. 5–6 show the structural body components of the high pressure embodiment of the relay device 216, which is particularly useful in high pressure fluid flow applications having an operative pressure range of 1000–5000 psi inclusive.

The high and low pressure embodiments exhibit several common structural features, and thus for convenience the common structure is discussed concurrently in the next few paragraphs.

As best seen in FIG. 1, housings 30, 230 have inlets 42, 242 primary outlets 44, 244 and 46, 246 connected to the valve actuator feed conduits 13 and 15 (see FIG. 1), lower and upper plenums 48, 248 and 50, 250 respectively, and a passageway 52, 252.

Housings 30, 230 are closed at their bottom ends by caps 32, 232 and at their top ends by covers 34, 234 and adjustment screws 36, 236. Caps 32, 232 and covers 34, 234 are secured to the housings 30, 230 by conventional fasteners such as bolts 35, 235. The adjustment screw 36 of the low pressure embodiment can be threaded into the cover 34 to varying depths, and is held securely in the selected position by locknut 40. The adjustment screw 236 of the high pressure embodiment is threaded over cover 234 to varying depths.

Outlets 44, 244 and 46, 246 are in communication with lower and upper housing plenums 48, 248 and 50, 250 respectively, and are vertically offset from the inlet 42, 242. Central passageways 52, 252 connect the upper plenum 50, 250 with the lower plenum 48, 248.

Directing attention solely to FIGS. 2–4, a piston structure 54 has a piston 56 at its upper end slidably disposed within the upper plenum, and a piston stem 70 at its lower end slidably disposed within the central passageway and the lower plenum. Piston 56 is of a generally hollow cylindrical configuration having a piston base 66, and a piston rim 58 fitted with a seal element 60 around its circumference. Seal element 60 acts on the inner wall surface 64 of the upper plenum 50, providing a seal between the piston and wall surface so as to prevent the pressurized working fluid from escaping around the piston rim 58.

Piston stem 70 has a larger diameter check valve blocking portion 72 at one of its ends, and a seal element 76 at the other. A beveled stem portion 74, retains seal element 76 which acts on the passageway walls 79 forming a pressurizing seal therewith.

In its closed position (see FIG. 2), piston 56 is biased in a downward direction by a spring 62, causing the piston base 66 to rest on a mechanical stop shoulder 68.

The depth at which the adjustment screw is inserted proportionally varies the bias force of the spring 62 on piston 56. Consequently, the operator may preselect an adjustment screw depth corresponding to a particular spring force, thereby requiring a greater or lesser pressure to be exerted on the piston in order for it to overcome the preselected spring force and move to the open position (FIG. 3).

A check valve 78 slidably disposed within the lower plenum has a rimmed top end 80 fitted with a seal element 94, a lower end 82, lateral check valve ports 86, and a central bore 84 which slidably receives the piston stem 70. The lower end 82 of the check valve serves as a spring guide for spring 88. Spring 88 is bottomed on the interior surface 90 of the end cap, and biases the check valve in an upward (closed) direction. When the check valve is in its closed position, seal element 94 abuts a valve seat surface 92 of the lower plenum.

When pressurized fluid is introduced through inlet 42 with the piston structure in the closed position, the pressurized fluid is prevented from entering the upper plenum 50 by the piston stem seal 76, a poppet structure 98, and seal ring 106, but is routed downwardly within the passageway 52, into the central bore 84 of the check valve 78, out through the horizontal ports 86, and into the master valve actuator via outlet 44 (as depicted by the flow arrows of FIG. 2).

When the pressure within the lower plenum 48, and the passageway 52 are sufficient to overcome the preselected biasing force of the spring 62 on the piston 56, the piston structure 54 is moved upwardly to its open position partially compressing spring 62 around a spring guide 38 as best seen in FIGS. 3 and 4.

With the piston is in its open position (FIG. 3), further introduction of additional working fluid is prevented from entering the lower plenum 48, because the check valve blocking portion 72 of piston stem 70 closes off check valve ports 86. Poppet structure 98 acts as a check valve between plenum 50 and passageway 52, wherein the fluid travels up passageway 52, around the beveled region of the piston stem 74, into the upper plenum 50, through the wing valve actuator outlet 46, and into the wing valve (as depicted by the flow arrows of FIG. 3).

Pressurized fluid injection through a series of passageways and into a constant volume chamber (like the master valve actuation chamber), invariably results in increased molecular activity, and thus thermal expansion of the fluid. Hence, it is desirable to provide a means for relieving the excess pressurization when it becomes necessary to do so. Consequently, the check valve blocking portion 72 does not form a full seal with the check valve bore 84, thereby preventing over-pressurization of the master valve actuating chamber due to the aforementioned thermal expansion of the fluid.

Additional flow of working fluid into the housing increases the downward force on the check valve top 80. When the downward force becomes great enough to partially compress the spring 88, check valve 78 is forced slightly downward a sufficient distance toward the inner surface 90 of the cap 32 to allow fluid flow between surface 92 and seal ring 94 to fully pressurize both valve actuators (see the flow arrows of FIG. 4).

When the inlet and outlet pressures reach an equilibrium pressure and static conditions occur, flow through the inlet 42 is discontinued and thus the downward force on the check valve 78 rapidly diminishes. Consequently, when the downward force on the top end 80 of the check valve is no longer sufficient to overcome the upward spring force, the check valve 78 returns to its biased closed position (FIG. 3).

When the inlet pressure is removed (in the closing cycle), both valve actuators attempt to depressurize, but the piston structure 54 remains in the upward position as shown in FIG. 3, because the backflow pressure forces from the wing valve actuator act on the area of the piston surface 66 of piston 56 as sealed by seal element 60, and the backflow from the main valve actuator act on the bottom surface of the piston stem 70. Accordingly, the wing valve actuator will depressurize before the main valve actuator, because the check valve ports 86, are blocked by the piston stem blocking portion 72 (see FIG. 3). This orientation will continue until the pressurized fluid in the upper plenum flows out inlet 42 thereby decreasing the pressure so that it can no longer overcome the downward biasing force of the piston spring 62, at which time the piston structure returns to its closed position (FIG. 2) and the master valve depressurizes. The residual fluid pressure trapped in the upper plenum below the piston will bleed back into the passageway through the poppet structure 98 in slidable communication with a drilled bore 100 (as shown in FIG. 2 by phantom lines), and out the inlet 42.

A poppet valve 99 has a head 104 fitted with a poppet seal element 106 that contacts surface 108 of drilled bore 100 in communication with a bleed passage 102. The residual fluid pressure travels down the bleed passage 102, enters the bore 100 and forces poppet 99 to open, thereby venting or bleeding off the residual pressure.

FIGS. 5 and 6 are directed to a second embodiment 216 of the invention, particularly useful in fluid flow applications having pressures within the range of 1000 to 5000 psi max inclusive.

A guide sleeve 256 having flow ports 258 is threadably mounted within the housing 230 and slidably receives a piston 260 disposed therein.

A spring 262 biases the piston 260 in a downward direction by applying a spring force to a spring guide 266 mounted on the upper end of the piston.

Piston 260 has a base 264 hosting an axially disposed bore 272 drilled partially therethrough, and a seal element 270 fitted around its outer circumference (see FIG. 6). Bore 272 slidably receives a piston stem 274 which extends downwardly through the central passageway 252 with a lower portion of the stem 276 that is constrained within the lower plenum.

In its unpressurized biased position (see FIG. 5), the biasing force of spring 262 is restricted by spring guide 266 contacting guide sleeve 256, the travel of the piston 260 is restricted by a stop member 268 having a seal element 280 disposed around its circumference. Stop member 268 is normally biased in an upward direction by a wave spring 278.

Much like the aforedescribed low pressure embodiment operable in its pressure range, when fluid ranging in pressure from 1000–5000 psi max. is introduced into the housing 230 through inlet 242, the fluid must necessarily travel down the passageway 252 and into the lower plenum 248 (see the flow arrows of FIG. 5). Upward travel of the fluid into the upper plenum is prevented by the piston 260 biased in the downward direction by the force associated with the spring 262 applied to the spring guide 266 mounted on its top end, forcing the piston to rest on the stop member 268.

The fluid exits the lower plenum 248 via outlet 244, to a main valve actuator (see FIG. 1) until the actuator is pressurized. Once pressurized, additional working fluid that is introduced into the housing raises the internal pressure forces acting on the internal surfaces of the housing and its components.

When the upward pressure force on the piston is sufficient to overcome the spring bias force applied indirectly thereto, the piston rises to an open position as best seen in FIG. 6. In this position, stop member 268 is biased in an upward direction by spring 278, the piston stem lower end 276 having a spring guide 282 is biased in an upward direction by the force associated with a spring 284, thereby creating a sealing contract between a lower plenum seal member 286 and the piston stem end 276 at surface 288. The piston base 264 and seal member 286 fitted with a seal element 290, cooperatively act as a check valve to ideally form a fluid tight seal therebetween. With the piston structure and piston stem so aligned, the high pressure fluid flows through outlet 246 as depicted by the flow arrows of FIG. 6, and pressurizes the wing valve actuator (see FIG. 1) in communication therewith.

Overpressurization due to the thermal expansion of the working fluid in communication with the lower plenum and main valve actuator is prevented by venting off the excess pressure through outlet 254 as depicted by the flow arrows of FIG. 6 to a relief valve (not shown).

When the flow of the working fluid is discontinued, the natural back pressure of the wing valve actuator is bled off through essentially the same flow path as its pressurizing path except in reverse. Once sufficiently depressurized, the piston returns to its position as shown in FIG. 5, wherein the piston stem is forced in a downward direction creating an exit flow path for the main valve actuator to depressurize via outlet 244 in the reverse direction of its pressurizing cycle.

A wholly mechanical variable pressure responsive valve of this type can accomplish the sequential switching operations of a relay system without the aid of additional switching elements, and thus is more desirable. Furthermore, alternate uses for the present invention become apparent; for example, the relay device 16, 216 may function as emergency relief valves, diversion valves for overpressurization, or the like.

From the foregoing description, it can be seen that the present invention provides an effective method for diverting and regulating the flow of fluid through a piping system along multiple paths or branches thereof, in response to an internal wholly mechanical switching signal. This type of design is advantageous because it minimizes the number of external elements incorporated in the system, and reduces maintenance costs as compared to a conventional relay system.

Manual operation or preset selection of a mechanical valve system embodied in the present invention enables a preselected working pressure to govern flow through a variety of paths. That is, a plurality of these devices interconnected could effectively control a vast number of switching applications independent of, and without a need for additional separate relay devices.

The foregoing detailed description is to be clearly understood as being given by way of illustration and example only, the spirit and scope of the present invention being limited solely by the appended claims.

What is claimed is:

1. A fluid pressure sequencing device for controllably pressurizing and depressurizing first and second chambers external to said device, comprising:
   a hollow housing having a first fluid flow port for flowing a pressurized fluid into and out of the interior of said hollow housing, a second fluid flow port connectable to said first external chamber to communicate its interior with said housing interior, and a third fluid flow port connectable to said second external chamber to communicate its interior with said housing interior; and
   pressure-operable valve means disposed within said housing interior,
   said valve means being responsive to an initial pressurized fluid inflow to said housing interior through said first fluid flow port to sequentially:
   (1) create a pressurized fluid outflow from said housing interior through said second fluid flow port to pressurize said first external chamber, and then
   (2) create a pressurized fluid outflow from said housing interior through said third fluid flow port to subsequently pressurize said second chamber,
   said valve means, after said first and second external chambers have been pressurized, being operable in response to an outflow of pressurized fluid flow from said housing interior through said first fluid flow port to sequentially:
   (3) vent pressurized fluid from the second external chamber successively through said third fluid flow port, said housing interior and said first fluid flow port to subsequently depressurize the second external chamber, and then
   (4) vent pressurized fluid from said first chamber successively through said second fluid flow port, said housing interior and said first fluid flow port to depressurize said first external chamber.

2. The device of claim 1 wherein:
   said pressure operable valve means comprises a piston assembly and a valve seat for regulating the fluid flow into and out of said third fluid flow port; a check valve element and a valve seat for enabling the regulation of fluid flow into and out of said second fluid flow port.

3. The device of claim 1 further comprising:
   a poppet valve and valve seat for releasing fluid pressure from said third fluid flow port when the working fluid pressures are 150 psi or less.

4. The device of claim 2 wherein:
   said piston assembly comprises a piston member, and a piston stem that slidably cooperates with said check valve element for diverting the fluid flow into and out of said second or said third flow ports in response to the pressure forces of said fluid flow.

5. The device of claim 2 wherein:
said check valve element is operable to enable said fluid outflow through said second and said third fluid flow ports simultaneously after said sequentially pressurizing said first external chamber before pressurizing said second external chamber and when the working fluid pressure is 150 psi or less.

6. The device of claim 1 further comprising:
adjustment means mounted on said housing for selectively varying the fluid flow pressure necessary to said create a pressurized fluid outflow from said housing interior through said third fluid flow port to subsequently pressurize said second chamber.

7. The device of claim 6 wherein:
said adjustment means threadably engages said housing.

8. A fluid pressure output sequencing device comprising:
a housing having an inlet for receiving pressurized fluid from the source thereof, a first outlet for discharging received pressurized fluid from the interior of said housing, and a second outlet for discharging received pressurized fluid from the interior of said housing;
piston valve means, disposed within said housing movable from an open to a closed position, for regulating fluid flow to and from said first outlet;
first means for biasing said piston valve means toward said closed position thereof;
check valve means, disposed within said housing and movable from an open to a closed position, fir diverting flow between said first and second outlets;
second means for biasing said check valve means toward said closed position thereof;
pressure relief means disposed within said housing for releasing fluid pressure associated with thermal expansion of the fluid from said first outlet;
said piston and said check valve means being operative, in response to an inflow of pressurized fluid through said inlet, in which fluid flow will sequentially:
(1) pass through said first outlet with said piston and said check valve means in biased rest positions thereof,
(2) move said piston valve means to said open position thereof, blocking flow to said first outlet, thereby diverting flow to said second outlet;

9. The fluid pressure outlet sequencing device of claim 8 wherein:
a poppet valve means is disposed within said housing when said working fluid pressures are 150 psi or less and movable from an open to a closed position for releasing residual fluid pressure from said second outlet.

10. The fluid pressure outlet sequencing device of claim 8 wherein:
said piston and said check valve means are further operative, in response to a subsequent backflow of fluid from said first and second outlets to said inlet, to sequentially,
(1)) ensure said check valve means is in the closed position with said piston valve means in said open position;
(2) move said piston valve means to said closed position.

11. A fluid pressure sequencing control system to pressurizing and depressurizing first and second valve actuating reservoirs, comprising:
relay means having a first inlet for receiving a pressurized supply of pilot operating fluid, a second inlet for receiving a system working fluid, a first outlet for transmitting and receiving the system working fluid to the system, a second outlet for expelling said working fluid from the system;
sequencing relay means having a housing, an inlet in said housing for receiving and transmitting said working fluid, a first outlet in said housing for transmitting and receiving said working fluid, a second outlet in said housing for transmitting and receiving said working fluid;
a first working fluid conduit communicating said first outlet of said relay means with the inlet of said sequencing relay means;
first valve actuating reservoir means for opening and closing a valve in response to pressure variations therein;
second valve actuating reservoir means for opening and closing a valve in response to pressure variations therein;
a second working fluid transmitting conduit communicating said first outlet of said sequencing relay means with said second valve actuating reservoir means; and
a third working fluid transmitting conduit communicating said second outlet of said sequencing relay means with said first valve actuating reservoir means,
said sequencing relay means further comprising;
piston valve means movable from an open too a closed position for regulating the flow of said working fluid to said first outlet and diverting the working fluid flow from said first outlet to said second outlet,
first means for biasing said piston valve means toward said closed position thereof;
check valve means operative from an open to a closed position for permitting the working fluid to flow out said first outlet, and diverting the working fluid flow to said second outlet;
second means for biasing said check valve means toward said closed position thereof;
pressure relief means disposed within said housing for releasing fluid pressure associated with thermal expansion of the fluid from said first outlet.

12. The valve actuating system of claim 11, wherein:
a poppet valve means is utilized when the working fluid pressure is 150 psi or less, and is movable from an open to a closed position for releasing backflow pressure of said working fluid from said second outlet when said piston and said check valve means are in said closed positions.

13. The valve actuating system of claim 11, wherein:
said relay means include a block and bleed relay.

14. The valve actuating system of claim 12, wherein:
said piston valve actuating reservoir means act on a master valve, and said check valve actuating reservoir means acts on a wing valve.

15. A fluid pressure sequencing device for controllably pressurizing and depressurizing first and second chambers external to said device, a generally cylindrical housing open at its top and bottom ends, having an upper plenum, a lower plenum, and a passageway communicating with said upper and lower plenums all disposed within said housing;

a first valve seat disposed within said upper plenum;

a second valve seat disposed within said lower plenum;

a third valve seat disposed within said passageway;

an inlet through said housing communicating with said passageway;

a first outlet through said housing communicating with said lower plenum;

a second outlet through said housing communicating with said upper plenum;

a cap member secured to said bottom end of said housing for closing off said bottom end;

a generally cylindrical cover member secured to the top end of said housing, and having a tapped central bore extending axially therethrough;

an adjustment screw operatively threaded into said central bore of said cover member;

a piston operatively disposed within said upper plenum for movement between open and closed positions;

said piston having a base, and a top;

means for biasing said piston toward its closed position such that a portion of said base contacts said first valve seat;

a generally cylindrical check valve operatively disposed within said lower plenum for movement between open and closed positions;

said check valve having a top end, a lower end of lesser diameter than the top end, a central bore extending axially therethrough, and at least one horizontal port formed in said top end and extending radially therethrough communicating the lower plenum with said central bore;

means for biasing said check valve toward its closed position, such that a portion of said top end of said check valve contacts said second valve seat;

a piston stem having a top end rigidly connected to the base of said piston, a body extending downwardly within said passageway, and a bottom end that slidably communicates with said central bore of said check valve; and poppet valve means disposed within said housing for operatively communicating said second outlet and said upper plenum with said passageway.

16. The fluid pressure output sequencing device of claim 15 wherein:

said device is operable in the pressure range of 150 psi motorless, and said piston biasing means is a spring, and said adjustment screw has a top end and a bottom end, wherein said bottom end forms a spring guide.

17. The fluid pressure output sequencing device of claim 15 wherein:

said adjustment screw is securely held in its installed position by a locknut.

18. The fluid pressure output sequencing device of claim 15 wherein:

said top rm of said piston is fitted with a seal element, and said top end of said piston stem hosts a seal element for selective engagement with said passageway.

19. The fluid pressure output sequencing device of claim 15 wherein:

said check valve biasing means is a spring, and said bottom end of said check valve is a spring guide.

20. The fluid pressure output sequencing device of claim 15 wherein:

said slidable communication of said piston stem with said central bore of said check valve provides a minimal passageway interface to enable slight backflow pressure from said first outlet to be vented away from said first outlet via said minimal passageway interface to compensate for an associated pressure rise due to thermal expansion.

* * * * *